United States Patent Office 3,543,561
Patented Dec. 1, 1970

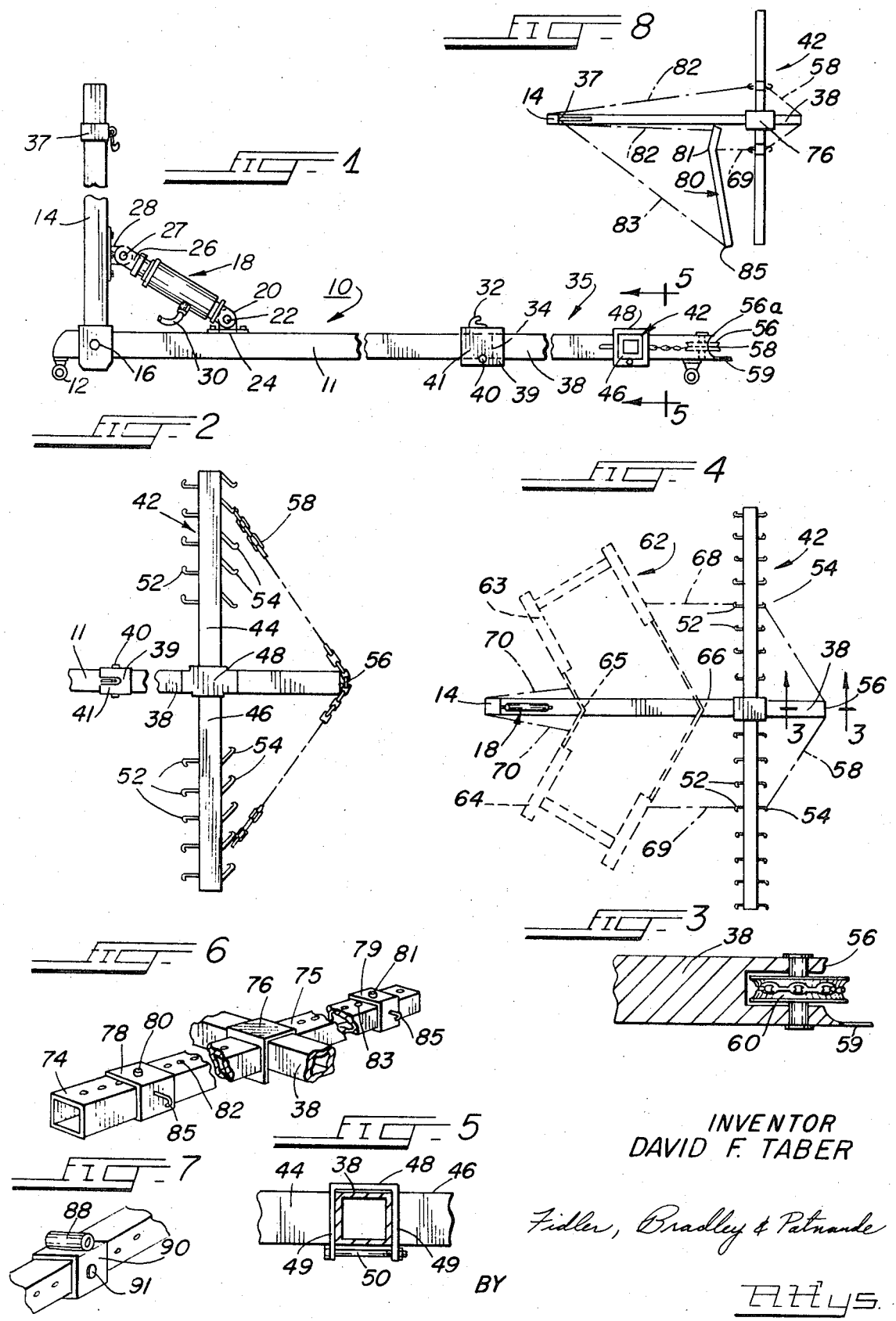

3,543,561
PORTABLE STRAIGHTENING DEVICE
David F. Taber, 1S785 Hawthorne Lane,
Wheaton, Ill. 60187
Filed Jan. 27, 1969, Ser. No. 794,308
Int. Cl. B21d 41/02
U.S. Cl. 72—392          6 Claims

ABSTRACT OF THE DISCLOSURE

Apparatus for straightening unitized automobile bodies and automotive frames includes a main beam having a tension applying member pivotally attached near one end and a crossbeam mounted thereon and held in a balanced position thereon by a chain connected to the crossbeam and slidably extending across the other end of the main beam.

---

The present invention generally relates to improvements in the art of straightening automobile bodies and the like, and it relates more particularly to a portable device for use in straightening unitized body constructions which have been damaged and distorted.

For the purpose of repairing damaged automobile bodies, automobile body repair shops ordinarily have the necessary force applying apparatus for straightening the sheet metal sections of the vehicles. Such apparatus is not, however, sufficiently designed for straightening the main frame members of the body. However, many of the compact and smaller vehicles now being made do not have a complete frame including longitudinally extending main frame members. Instead, the central portion of the body serves as the main structural connection between the front and rear portions of the car and as the main structural support for the central portion of the vehicle. When, therefore, the vehicle is involved in an accident, the central portion of the body is frequently distorted in relation to the principal longitudinal axis of the vehicle. Even though the portable equipment normally used by body repair technicians for straightening body parts is strong enough for straightening unitized bodies which have been distorted in this manner, such equipment is not suitable for this purpose, and therefore, it has been necessary to send such a vehicle to a so-called frame shop specializing in straightening heavy frames and the like. The frame shops normally have relatively permanent and heavy apparatus for straightening frame members and it can also be used for straightening unitized bodies. However, the cost of transporting the vehicle between the frame shop and the body shop is substantial and adds a significant amount to the cost of the complete repair job. Moreover, the time required to so transport the vehicle to and from the frame shop and the time lost in scheduling the work at the frame shop in many cases causes an appreciable delay in completion of the body repair job. It would be desirable, therefore, to provide apparatus which is sufficiently light in weight so as to be portable, which can be put away for storage when not in use and which is relatively inexpensive as compared to the prior art frame and body straightening equipment. With such apparatus, the average body shop could straighten unitized bodies. Since the average body shop ordinarily has a force applying apparatus such, for example, as that described in Pat. 3,131,748, it would be desirable to provide an attachment for such apparatus making it more suitable for use in straightening unitized bodies and the like. In this way, the need for transporting the automobile back and forth between the body and frame shops can be avoided.

Therefore, an object of the present invention is to provide a new and improved body straightening device.

Another object of the present invention is to provide a new and improved portable body straightening device.

A further object of the present invention is to provide an attachment for a single axis force applying straightening device which renders such device useful in straightening unitized body constructions.

Briefly, the above and further objects may be realized in accordance with the present invention by providing a main beam having a force applying member mounted near one end thereof and having a crossbeam mounted near the other end thereof, means being provided on the crossbeam to attach tension applying members between two points on the vehicle and locations on the crossbeam equally displaced from the main beam. Means are also provided on the crossbeam so that a flexible, tension applying member may be connected to similarly disposed points on the crossbeam, which member extends across the distal end of the main beam thereby to maintain the crossbeam in a balanced position relative to the main beam when a force is applied to the body via the force applying means.

Further objects and advantages and a better understanding of the invention may be had by reference to the following detailed description taken in connection with the accompanying drawings wherein:

FIG. 1 is a side elevational view of a portable body straightening device embodying the present invention;

FIG. 2 is a top plan view of a portion of the device shown in FIG. 1;

FIG. 3 is a cross-sectional view of an alternative embodiment of the present invention;

FIG. 4 is a schematic view illustrating the manner in which the device of the present invention may be used to straighten a unitized body construction;

FIG. 5 is a cross-sectional view taken along the line 5—5 of FIG. 1;

FIG. 6 is a perspective view of an alternative embodiment of the present invention;

FIG. 7 is a perspective view of an alternative embodiment of the present invention; and FIG. 8 is a schematic view of another way in which the device of the present invention may be used to straighten an automobile body construction.

Referring now to the drawings and particularly to FIG. 1 thereof, there is shown a body straightening device 10 comprising a main beam member 11 which is preferably of tubular construction and which has mounted near one end thereof a caster 12. A force applying arm 14, which is preferably a solid metal bar square in cross section, is pivotally attached to the beam 11 by means of a pintle 16. A hydraulic piston and cylinder assembly 18 is interconnected between the beam 11 and the arm 14 for applying a force between the beam 11 and the arm 14. Considered more particularly, the cylinder portion of the assembly 18 is pivotally connected by a pair of clevis arms 20 and a pin 22 to a suitable bracket 24 which is rigidly secured to the beam 11. A similar pair of clevis arms 26 connected to the piston of the assembly 18 are pivotally connected by a pin 27 to a bracket 28 fixedly secured to the arm 14. It will be apparent to those skilled in the art that when a pressurized fluid is applied to the cylinder 18 via the line 30 the piston moves to the left as shown in FIG. 1, thereby moving the arm 14 in a counterclockwise direction relative to the beam 11. A hook 32 is fixedly conncted to the beam 11 near the end 34 thereof and a hook 36 is connected to the arm 14 by a slidable bracket 37 to accommodate flexible tension members such as chains which may be connected to the workpiece or body being straightened. An attachment 35 is connected to the beam 11 by means of a channel shaped connector 39 which is secured as by welding over an end portion of a beam extension member 38 and which is adapted to extend over the end portion of the beam 11. A pin 40 extends through aligned apertures in the side flanges 41 of the member 37 under the beam 11 to maintain the beam members 11 and 38 in alignment with their adjoining ends in abutment.

Slidably attached to the beam member 38 is a crossbeam 42 consisting of a pair of tubular members 44 and 46 (FIG. 2) which are secured as by welding to a channel member 48 which loosely fits over the beam member 38 as best shown in FIG. 5. A pin 50 extends through aligned apertures in depending flange portion 49 of the member 48 beneath the beam 38 to attach the crossbeam to the beam 38 but to permit the crossbeam 42 to slide axially along the beam 38.

As shown in FIG. 2, a plurality of hooks 52 are secured to the left side of the crossbeams 44 and 46 as, for example, by welding. The hooks are arranged along the crossbeam members 44 and 46 in equally spaced relationship with respect to the longitudinal axis of the beam 38 whereby the hooks are adapted to be used in pairs with each hook in the pair spaced the same distance from but opposite sides of the longitudinal axis of the beam 38. Mounted on the opposite or right-hand side of the crossbeam members 44 and 46 are a plurality of hooks 54 which are positioned exactly opposite to the hooks 52 but which angle out from the crossbeam members in the general direction of the distal end 56 of the crossbeam 38. The distal end 56 of the beam 38 is concave as shown in FIG. 1 and a horizontally extending flange portion 59 which may be integral with the beam or which may be a bracket fixedly attached thereto extends a substantial distance beyond the upper end 56a. In use, a flexible tension member such, for example, as a chain 58 slidably extends across the distal end 56 of the beam 38 and is connected to selected ones of the hooks 54 on the cross member 44 and 46, the selected hooks being equally spaced from the beam 38 as shown in FIG. 2.

Referring to FIG. 4, there is illustrated in somewhat schematic form the manner in which the device of the present invention may be used to restore or straighten a unitized body which has been badly damaged or distorted. It will be understood that FIG. 4 is for illustration purposes only and a body would normally not be bent to the extent illustrated. As shown, an automotive vehicle body 62 of the unitized body construction includes a frame assembly 63 at one end of the car, the frame assemblies 63 and 64 being connected together by the relatively fragile sheet metal portions at the center of the car, which portions are illustrated being bent at 65 and 66.

In order to use the device of the present invention, the main beam 11 is moved under the vehicle and, more particularly, aligned with the bends 65 and 66 therein. The attachment 35 is then connected to the end of the beam 11 by means of the member 39 and the chain 58 is attached to the crossbeam and over the end of the beam 38 so that it is relatively tight. A pair of flexible tension members 68 and 69, such, for example, as link chains, are then attached at one end to a set of hooks 52 which are equally spaced from the beam member 38 and are attached at the other ends to suitable places on the vehicle body. The hooks 52 to which the members 58 and 59 are connected are directly opposite to the hooks 54 to which the chain 58 is connected. A single chain 70 or a pair of chains are then connected from the hook 37 or from other appropriate means on the member 14 to the side of the body closest to the arm 14. If desired, a single chain can connect directly from the arm 14 to the bent area 65.

When the chains thus attached, the line 30 to the cylinder 18 is pressurized to pivot the arm 14 rearwardly thereby to exert a tensile force on the chains 70 which results in a reaction tensile force being exerted on the body by the chains 68 and 69. The chain 58 will, of course, tighten as the crossbeam 52 slides toward the body and thereafter the chain 58 maintains the crossbeam in a fixed balanced position on the beam 38. If, for example, the pulls on the chains 68 and 69 are not exactly equal, the main beam 11 and crossbeam 42 will move to the left or right until the angles and tension are equalized in chains 68 and 69.

Inasmuch as the chains 68 and 69 are connected to the crossbeam members 44 and 46 at loctaions directly opposite to the positions to which the chain 58 is connected, there is no bending moment exerted on the crossbeam members 44 and 46 and the entire reaction force is thereby taken up by the beams 11 and 38 which are held in alignment by the attachment channel 41. It may be seen from a reference to FIG. 4 that the force exerted by the cylinder 18 through the arm 14 thus may be used to restore the body 62 to the undistorted condition.

Referring to FIG. 6, there is illustrated another embodiment of the present invention which eliminates the multiplicity of hooks 52 and 54 on the crossbeam members. In this embodiment of the invention the crossbeam consists of a pair of tubular members 74 and 75 which are connected as by welding to flanges on a channel-shaped connecting member 76 slidably disposed on the beam member 38. A pair of chain attaching members or collars 78 and 79 which are tubular in construction and slidably fit over the members 74 and 75 are held in place thereon by respective ones of a plurality of pins 80 and 81 which extend through aligned openings in the top and bottom portions of the attachments 78 and 79 through selected ones of a plurality of holes 82 and 83 in the cross members 74 and 75. The holes 82 and 83 are arranged in pairs equally spaced from the longitudinal axis of the beam 38 so that the user may place the attachment devices 78 and 79 in equally spaced positions along the crossbeam members 74 and 75. A pair of hooks 85 are provided on each of the attachment members 78 and 79, one hook being in the front and the other in the rear as shown in FIG. 6. The rear hooks (not shown) extend from the rearward side of the collars 78 and 79 thereby to receive the chain 58 which extends over the distal end of the beam extension 38. When using the embodiment of FIG. 6, the attachment members 78 and 79 are positioned at equal distances from the beam extension 38 and the chains 68 and 69 are connected from the forward hooks 85 and the chain 58 is connected between the rearward hooks 85 across the distal end of the beam extension 38 as explained in connection with FIG. 4.

In still another embodiment of the invention, attachment means similar to those (78 and 79) shown in FIG. 6 are employed, but in this case a tubular member 88, such, for example, as a section of pipe is welded to the top of the attachment member and a single chain connects to the automobile body on opposite sides of the bend and extends through the tubes 88 and over the distal end of the beam member 38. It may thus be seen that when using this embodiment a single chain is used in place of the three chains 58, 68, and 69 in FIG. 4.

From the foregoing description, it will be apparent that in the embodiment of the invention shown in FIGS. 1 through 6, the crossbeam member 42 is preferably slidable along the beam extension 38 to permit tightening of the chain 58 to prevent bending of the crossbeam members 44 and 46. With the embodiment of FIG. 7, however, the crossbeam 42 is not slidable along the beam extension 38 inasmuch as the chains extend loosely through the pipe section 88 and thereby become tightened when the cylinder 18 is pressurized.

Although the attachment device of the present invention finds wide application in body shops having a force applying member 16, and it is preferable that the attachment portion be separable from the remainder of the device to facilitate handling and storage, it is apparent that the beam members 11 and 38 could be made integral if desired.

Referring to FIG. 8, there is schematically shown another manner in which the device of the present invention may be used. In this case, it is assumed that the unit 10 cannot be positioned beneath the body and must, therefore, be located forwardly or rearwardly of the car. In this case, the main beam 11 is positioned forwardly of a damaged frame 80 of the car which is bent at 81 and which is to be straightened. The crossbeam 42 is, therefore, to one side of the vehicle. One of the chains 69 is then attached to the location 81 of the bend and to the crossbeam 42. Another chain 82 is connected to the frame member 80 forwardly of the bend 81 and extends slidably around the arm 14 and is connected to the crossbeam 42 at a location equally spaced from and on the opposite side of the center line from which the chain 69 is connected. Another chain 83 is connected between the hook 37 on the arm 14 to a location 85 at a rearward position on the vehicle. The chain 58 is then connected between the locations to which the chains 69 and 82 are connected to the crossbeam 42 and slidably positioned over the distal end of the beam member 38.

It will be apparent that if desired the beam 11 and the extension 38 may be positioned entirely forwardly of the automobile and one advantage of this is that the crossbeam may be elevated to substantially the same height as the frame member 80 which is being straightened so that there is no upward force exerted on the beam 42 tending to bend it or separate it from the connector 48.

In use, with the chains 58, 69, 82, and 83 connected as illustrated in FIG. 8, and the cylinder 18 pressurized, a tensile force is exerted on the chains 82 and 83 and a reaction force is exerted on the chain 69. As the arm 14 moves leftwardly as shown in FIG. 8, the chain 82 will slide around the arm 14 as the portion of the beam 80 forward of the bend 81 moves leftwardly. The chain 83 prevents the device 10 from rotating in a generally clockwise direction when the arm 14 is actuated.

While the present invention has been described in connection with particular embodiments thereof, it will be understood that those skilled in the art may make many changes and modifications without departing from the true spirit and scope of the invention. Therefore, by the appended claims it is intended to cover all such changes and modifications as come within the true spirit and scope of this invention.

I claim:

1. Apparatus for straightening automobile bodies and the like, comprising
a main beam having a first end and a second end,
a force applying member movably mounted on said main beam near said first end thereof,
a crossbeam mounted on said main beam,
a flexible tension member connected to said crossbeam at locations equidistant from said main beam and slidably extending across said second end of said main beam,
tension members for connection from said locations on said crossbeam to the automobile body or the like to be straightened, and
a tension means for connection between said automobile body or the like and said force applying member.

2. Apparatus according to claim 1 further comprising
a pair of tension member attachment means adjustably mounted on said crossbeam on respective sides of said main beam.

3. Apparatus according to claim 1 further comprising
means for slidably connecting said crossbeam to said main beam to permit said crossbeam to move along said main beam to tighten said tension members.

4. Apparatus according to claim 1 comprising
a plurality of pairs of hooks respectively fixed to said crossbeam at positions equally spaced from said main beam.

5. Apparatus according to claim 1 comprising
at least one pair of apertured means respectively disposed on said crossbeam at locations equidistant from said main beam, and said flexible tension members and said tension members are connected together to form a single tension member, said single tension member extending through said apertures.

6. Apparatus according to claim 1 wherein
said main beam includes first and second aligned portions, and
attachment means for removably connecting said first and second portions together in mutually aligned relationship.

References Cited

UNITED STATES PATENTS

| | | | |
|---|---|---|---|
| 3,149,659 | 9/1964 | Bogert | 72—705 X |
| 3,131,748 | 5/1964 | Junkins | 72—705 X |
| 3,007,509 | 11/1961 | Eck | 72—705 X |
| 3,034,564 | 5/1962 | Cavazos | 72—392 |
| 3,292,410 | 12/1966 | Baldassano | 72—392 |

CHARLES W. LANHAM, Primary Examiner

A. L. HAVIS, Assistant Examiner

U.S. Cl. X.R.

72—705